(12) United States Patent
Fuhrmann et al.

(10) Patent No.: US 7,885,403 B2
(45) Date of Patent: Feb. 8, 2011

(54) RADIOTELEPHONE

(75) Inventors: Thomas Fuhrmann, Dulmen/Buldern (DE); Annett Ortscheid (nee Wilke), Bochum (DE); Dirk Umbach, Hildesheim (DE); Ricky William Barnett, Hertfordshire (GB); Terence Johnson, Hampshire (GB); Mark Robert Mason, Herfordshire (GB); Bruce Samuels, Reading (GB); Tony Horne, Hampshire (GB)

(73) Assignee: Nokia Corporation, Espoo (FI)

( * ) Notice: Subject to any disclaimer, the term of this patent is extended or adjusted under 35 U.S.C. 154(b) by 430 days.

(21) Appl. No.: 11/431,220

(22) Filed: May 9, 2006

(65) Prior Publication Data

US 2006/0239445 A1 Oct. 26, 2006

Related U.S. Application Data

(60) Division of application No. 10/376,740, filed on Feb. 28, 2003, now Pat. No. 7,092,520, which is a continuation-in-part of application No. 09/125,700, filed as application No. PCT/EP97/00910 on Feb. 24, 1997, now Pat. No. 7,239,700, said application No. 10/376,740 is a continuation-in-part of application No. 09/870,173, filed on May 30, 2001, now Pat. No. 6,487,397, which is a continuation of application No. 08/800,591, filed on Feb. 18, 1997, now Pat. No. 6,347,218.

(30) Foreign Application Priority Data

Feb. 28, 1996 (EP) .................................. 96102988

(51) Int. Cl.
*H04M 1/00* (2006.01)
*H04M 9/00* (2006.01)

(52) U.S. Cl. .................................. 379/433.11; 379/440
(58) Field of Classification Search ............ 379/433.01, 379/433.02, 433.03, 433.04, 433.11, 440; 455/90.3, 550.1, 575.1
See application file for complete search history.

(56) References Cited

U.S. PATENT DOCUMENTS

| 4,124,785 | A | 11/1978 | Seretny et al. |
| 4,142,312 | A | 3/1979 | Stokes |
| 4,291,202 | A | 9/1981 | Adams et al. |
| 4,292,481 | A | 9/1981 | Barnes et al. |
| D262,214 | S | 12/1981 | Obst |
| 4,621,373 | A | 11/1986 | Hodsdon |

(Continued)

FOREIGN PATENT DOCUMENTS

DE 94 03 890 U1 8/1995

(Continued)

*Primary Examiner*—Fan Tsang
*Assistant Examiner*—Phylesha Dabney
(74) *Attorney, Agent, or Firm*—Harrington & Smith (57) ABSTRACT

A hand held communications device is provided. The device includes: a circuit board including electronic components; display coupled to the circuit board; a housing substantially surrounding the circuit board and electronic components, wherein the housing includes a base element covering a bottom side of the circuit board and electronic components and a housing element attached to the base element covering a top side of the circuit board and electronic components, wherein the housing element includes a display aperture with the display partially projecting therethrough; and a cover removably connected to the housing by a connection, wherein the cover and the base element substantially enclose the housing element therebetween.

12 Claims, 5 Drawing Sheets

U.S. PATENT DOCUMENTS

| | | |
|---|---|---|
| 4,679,231 A | 7/1987 | Reichle |
| 4,945,633 A | 8/1990 | Hakanen et al. |
| 5,036,432 A | 7/1991 | Uronen et al. |
| 5,045,973 A | 9/1991 | Saarela et al. |
| 5,096,317 A | 3/1992 | Phillippe |
| 5,175,873 A | 12/1992 | Goldenberg et al. |
| 5,233,506 A | 8/1993 | Seminik et al. |
| 5,235,636 A | 8/1993 | Takagi et al. |
| 5,276,588 A | 1/1994 | Repplinger et al. |
| 5,357,065 A | 10/1994 | Mitamura et al. |
| 5,357,570 A | 10/1994 | Tomura et al. |
| 5,509,057 A | 4/1996 | Anello et al. |
| 5,577,267 A | 11/1996 | Jungles-Butler et al. |
| D385,876 S | 11/1997 | Park |
| D385,887 S | 11/1997 | Park |
| 5,722,055 A | 2/1998 | Kobayashi et al. |
| 5,733,023 A | 3/1998 | Lee |
| 5,942,352 A | 8/1999 | Neil et al. ................ 429/96 |
| 5,946,637 A | 8/1999 | Umbach et al. ............ 455/573 |
| 5,982,881 A * | 11/1999 | Mischenko ............ 379/433.11 |
| 6,084,962 A | 7/2000 | Plenge ....................... 379/433 |
| 6,102,743 A | 8/2000 | Haffenden et al. .......... 439/630 |
| 6,173,194 B1 | 1/2001 | Vanttila ...................... 455/566 |
| 6,226,189 B1 | 5/2001 | Haffenden et al. .......... 361/814 |
| 6,317,588 B1 | 11/2001 | Curtis et al. ................. 455/90 |
| 6,347,218 B1 | 2/2002 | Fuhrmann et al. |
| 6,487,397 B2 | 11/2002 | Fuhrmann et al. |
| 6,510,328 B1 | 1/2003 | Myllymaki ................ 455/575 |
| 6,785,386 B1 | 8/2004 | Mason ................ 379/433.01 |
| 6,847,806 B2 * | 1/2005 | Curtis et al. ............... 455/90.3 |

FOREIGN PATENT DOCUMENTS

| | | |
|---|---|---|
| JP | 59126354 A1 | 7/1984 |
| JP | 63300652 A | 12/1988 |
| JP | 3113134 | 11/1991 |
| JP | 6-54338 | 7/1994 |
| JP | 879348 | 3/1996 |
| JP | 06232556 | 3/1996 |
| WO | WO-93/17513 A1 | 9/1993 |

* cited by examiner

RADIOTELEPHONE

CROSS REFERENCE TO RELATED APPLICATIONS

This is a divisional patent application of U.S. patent application Ser. No. 10/376,740 filed on Feb. 28, 2003, now U.S. Pat. No. 7,092,520, which is a Continuation-in-Part of and claims priority under 35 U.S.C. 120 to U.S. patent application Ser. No. 09/125,700 filed on Oct. 23, 1998 now U.S. Pat. No. 7,239,700, which in turn claims priority under 35 U.S.C. 119 as a 371 application of PCT/EP97/00910 filed on Feb. 24, 1997, based on European Patent Office (EPO) 96102988.1 filed on Feb. 28, 1996, and is also a continuation-in-part of Ser. No. 09/870,173, filed May 30, 2001, now U.S. Pat. No. 6,487,397 issued on Nov. 26, 2002, which is a continuation of U.S. patent application Ser. No. 08/800,591 filed on Feb. 18, 1997 and issued as U.S. Pat. No. 6,347,218.

BACKGROUND OF THE INVENTION

This invention relates to a radiotelephone.

It has become desirable to be easily able to replace housing parts of radiotelephones. For example, customers may want to replace a broken or scratched housing for repair purposes, or to change the appearance of a radiotelephone by replacing its housing with another of a different appearance. Also, there may be a need for radiotelephones to be supplied to dealers without being fully housed, so that the dealers can fit distinctive housings of their own before the radiotelephones are sold. Normally it is the user interface housing of the phone that is replaced in this way.

Normally, when housing parts of a phone, especially user interface housing parts, are removed the internal components of the phone become loose and/or exposed and there is a significant risk of them being damaged. This makes it risky for unskilled people to replace the phone's housing parts, or for phones to be shipped in a partially housed state.

SUMMARY

According to the present invention from one aspect there is provided: an electronic radiotelephone comprising: a first housing; a second housing releasably attachable to the first housing to meet with the first housing around the periphery of the radiotelephone; and retaining means comprising a cover, for holding the electronic components of the radiotelephone to the first housing when the second housing is released from attachment with the first housing.

The cover may extend over all or some of the electronic components of the phone. If the cover does not extend over all the components then the retaining means may comprise further articles such as a circuit board or another cover. The cover preferably retains user interface components such as a microphone, a speaker, a display or a keymat. The cover preferably has means to allow communication between the retained user interface components and a user—for example a transparent or translucent portion, a deformable portion or a hole or aperture. The cover may hold one or more seals behind it, preferably for sealing around user interface components and, most preferably, associated apertures.

The cover is preferably attachable to the first housing, either directly or via other components of the retaining means. The cover is most preferably releasably attachable—for example by spring clips.

The first and second housings preferably provide front and rear outer casings for the radiotelephone. The housings preferably meet around substantially all of the perimeter of the radiotelephone, although there may suitably be regions where they do not meet—for example to provide access to the interior of the phone (e.g. for connectors).

At least one user interface component may be held captive between the second housing and the retaining means when the second housing is attached to the first housing. That said component is preferably a component which is visible, most preferably over a substantial region of the surface of the radiotelephone, when the radiotelephone is assembled. The component is preferably a keymat.

The cover preferably holds a keymat and/or a member that provides at least one user-actuable key to the first housing.

According to the present invention from a second aspect there is provided an electronic device having a housing which has a housing wall with openings for control elements and/or display elements, characterised by attachment means for detachably connecting to the housing an external wall element which at least partially covers the housing wall, the external wall element having openings which are aligned with the openings in the housing wall.

When the housing wall provided with openings is covered by the external wall element, the openings provided in the housing wall and in the external wall element are preferably aligned with one another so that for example the pushbutton keys which may project through the openings can continue to be used even after the external wall element is fitted on to the housing wall and/or so that display elements which may be inserted into the openings can be read. This preferably also applies to microphones or loudspeakers which may be inserted into the openings—for example in the case of cordless telephones.

By means of either aspect of the invention, the electronics provided in the device may suitably be protected against access by the customer when the external appearance of the housing is modified. Then, if one external wall element is to be replaced by another in order to give the electronic device a new design there is a reduced risk of the electronics present in the housing being damaged when the external wall elements are interchanged, or of the user being subjected to danger by the electronics present inside the housing. The external wall elements could even be interchanged when an electronic device is operating.

According to an advantageous refinement of the invention, the external wall element can engage, at least partially, over further housing walls of the housing so that the design of the housing can be modified to an even greater extent or adapted to the wishes of the user to an even greater degree.

The profile of the external wall element can preferably follow the profile of the housing walls of the housing, for instance if emphasis is being placed not so much on the modification of the shape of the housing but on changing the colour or the type of material of the housing. Alternatively, the external wall elements can have different shapes (which can also deviate from one another to a greater degree) provided it is ensured that after the respective external wall elements have been connected to the housing respective openings in the fitted-on external wall element and in the housing wall in question are aligned with one another.

The external wall element can preferably be of, for example, shelf-shaped design so that it can be fitted for example with one edge on to a base which projects outwards beyond the side walls of the housing.

Any desired attachment means can be used to attach the external wall element to the housing of the electronic device, but attachment means with press-on/catch closure can preferably be used. They preferably ensure a secure connection between the external wall element and the housing and, moreover, can suitably be easily used without a special tool being required for them.

BRIEF DESCRIPTION OF THE DRAWINGS

The present invention will now be described, by way of example, with reference to the accompanying drawings, in which.

DETAILED DESCRIPTION

The invention is explained below with reference to two embodiments of mobile phone.

Figure 1A:
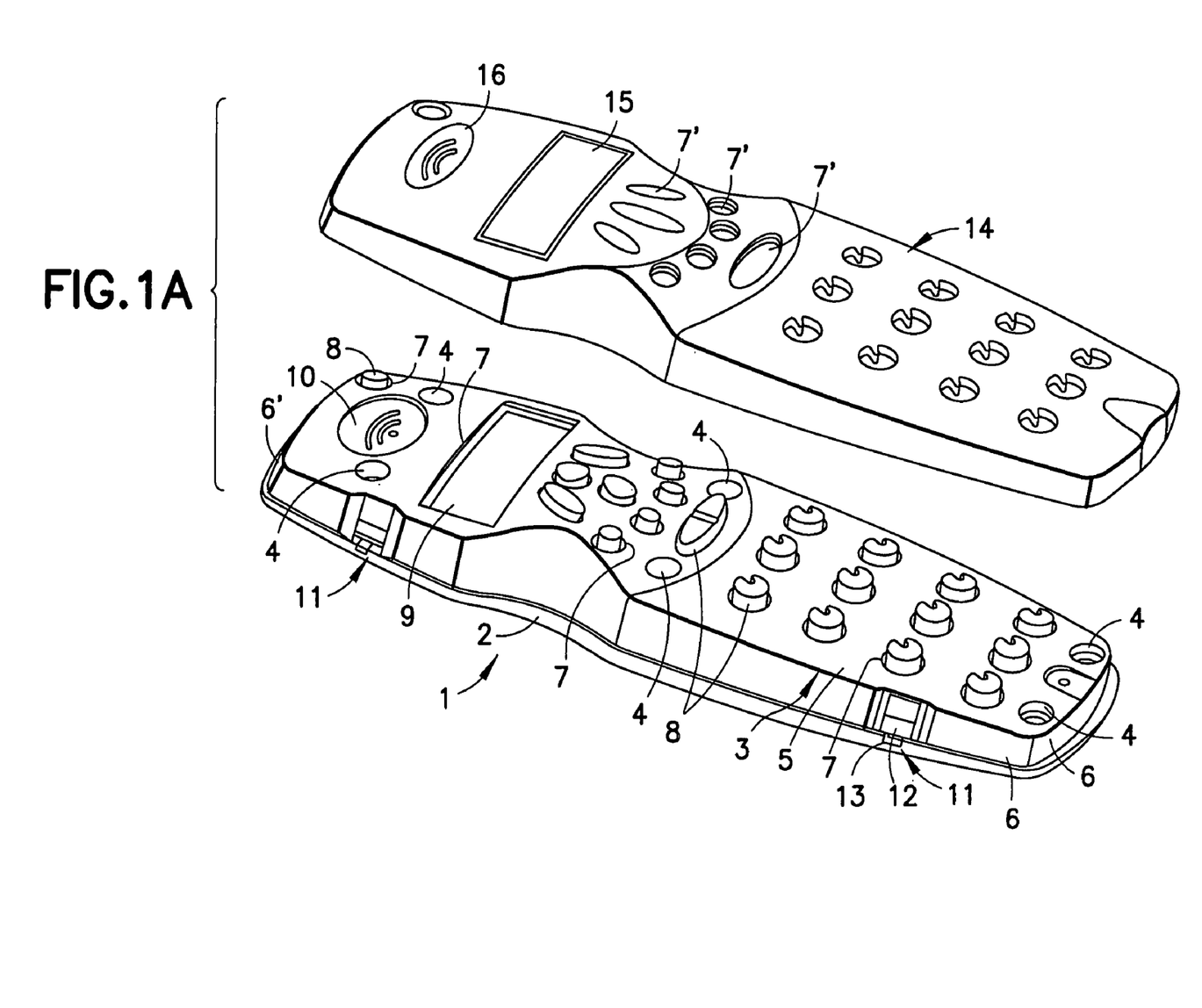
FIG. 1A shows a radiotelephone of a first embodiment with its external wall element removed.
Figure 1B:
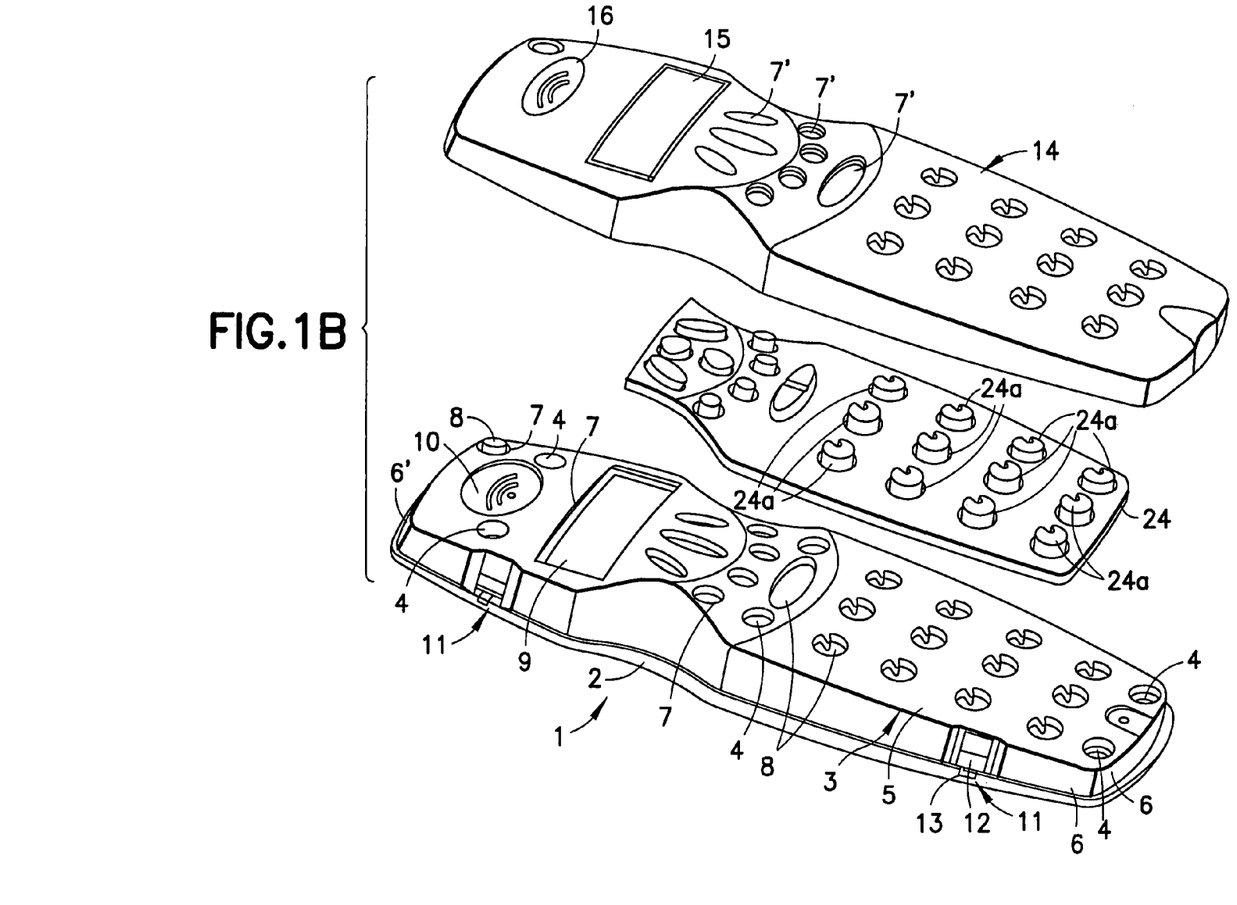
FIG. 1B shows the radiotelephone of FIG. 1A showing a keymat held between a cover and a first housing.

FIGS. 1A and 1B show a mobile phone having a housing 1 with which a plate-shaped base element 2 and a shell-shaped housing element 3 are associated. The plate-shaped based element 2 and the shell-shaped housing element 3 are connected to one another using screws (not illustrated) which project upward through openings 4 in the shell-shaped housing element 3 and are screwed into sockets (not illustrated) which are fixedly connected to the inside of the plate-shaped base element 2. Inside the housing 1 there is a carrier plate or circuit board for electronic components etc., attached in a suitable way.

The shell-shaped housing element 3 has a housing wall 5 which is disposed essentially parallel with the plate-shaped base element 2 and located at a distance therefrom and is integral with side walls 6 which are supported with their free or lower edge on the plate-shaped base element 2. In this arrangement, the plate-shaped base element 2 projects outwards beyond the side walls 6 by constant distance in its edge region so that a profile with an identical contour is obtained.

In the housing wall 5 there is a plurality of through-openings 7 through which components inside the housing 1 partially project. The through-openings 7 can be provided for, for example, push-button keys 8, a display device 9 or a loudspeaker device/microphone device 10. A corresponding through-opening may also be present in the rear side wall 6' for an aerial.

On each of the side walls 6 extending in the longitudinal direction of the housing 1 there are two attachment means 11, at a distance from one another, which are designed as push fit/catch closures. They are located in each case near the front and rear ends of the telephone. The attachment means 11 have a catch projection 12 which is biased outwards in a sprung fashion and can be pressed inwards into the housing 1 against the outwardly acting spring force by means of an externally accessible activation element 13. The attachment means serve to attach to the housing 1 an external wall element 14 which is fitted over the shell-shaped housing element 3 and is also of shell-shaped design.

The shell-shaped external wall element 14 which is illustrated in FIG. 1 has approximately the same contour as the shell-shaped cover 3 but is designed in such a way that it can receive the shelf-shaped housing element 3 in it. If the external wall element 14, which is designed as a thin-walled shell, is fitted on to the shell-shaped housing element 3, the shell-shaped external wall element 14 is supported with the free or downwardly pointing edge of its side walls on that part of the plate-shaped base element 2 which projects outwards beyond the shelf-'shaped housing element 3. Here, the wall thickness of the side walls of the shell-shaped external wall element 14 corresponds to the distance by which the edge of the plate-shaped base element 2 projects outwards beyond the side walls 6, 6' of the shell-shaped housing element 3. As a result, no step remains in the connection area between the shell-shaped external wall element 14 and the plate-shaped base element 2. The height of the side walls of the shellshaped external wall element 14 can be selected such that the main face of the external wall element 14 comes to rest at a short distance from the housing wall 5 and as a result does not exert any pressure on the latter.

Openings 7', which are aligned with the openings 7 in the housing wall 5 of the shell-shaped housing element 3, are provided in the main face of the external wall element 14. Therefore, it is possible to continue to operate the telephone even when the external wall element 14 is fitted on to the shell-shaped housing element 3. At the same time, the push-button keys 8 can be of such a height that they also project outwards beyond the external wall element 14. Openings which are present in the external wall element 14 for the display device 9 and the loudspeaker device/microphone device 10 can be covered, for example by means of a transparent element 15 or a grille 16.

FIG. 1B shows the use of a keymat 24 wherein the keys 24a may be used to operate a plurality of keys 8 which may not be of such a height that they project outwards beyond the external wall element 14.

Figure 2:
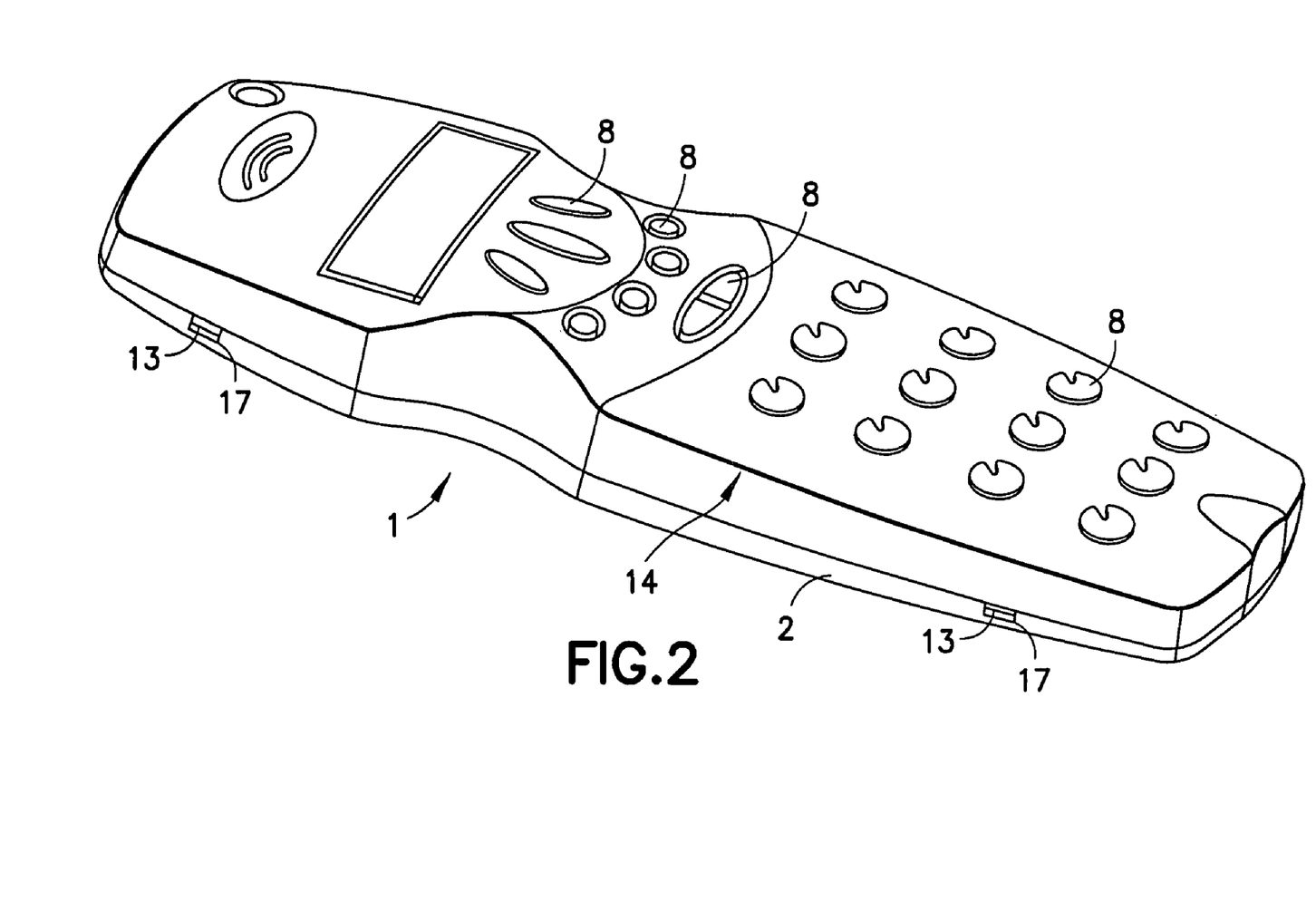
FIG. 2 shows the radiotelephone of FIG. 1 with the external wall element fitted.
Figures 3, 4:
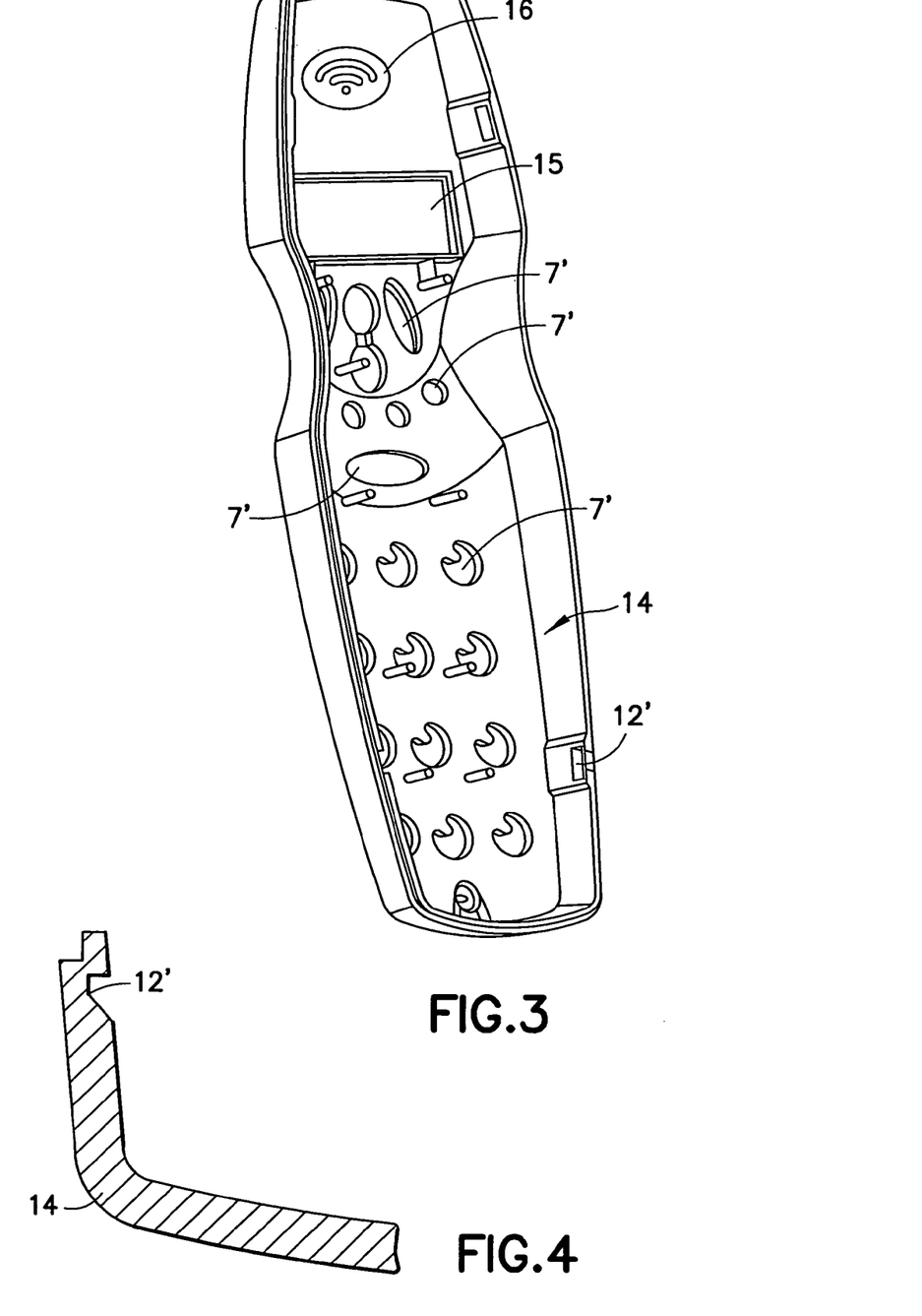
FIG. 3 shows a view of the interior of housing 14 of the radiotelephone of FIG. 1.
FIG. 4 shows a cross-section through part of the housing of FIG. 3.

FIG. 2 shows the cordless telephone or mobile phone in a state in which the shell-shaped external wall element 14 is fitted on to the shell-shaped housing element 3 and is detachably connected to the housing 1. On the internal faces of the long side walls of the external wall element 14 there are notches for the catch projections 12 of the attachment means 11 so that the catch projections 12 engage in the notches as a result of the outwardly pressing spring force, and thus hold the external wall element on the housing 1. In this state, the activation elements 13 are also pushed outwards but only to such an extent that they do not project beyond the side edge of the plate-shaped base element 2 or of the external wall element 14. The activation elements 13 can extend here in a groove 17 in the upper face of the plate-shaped base element 2. If the activation elements 13 are pressed inwards, that is to say inwards along the groove 17, for example using a pointed object, they move the catch projections 12 correspondingly inwards along with them so that the said catch projections 12 disengage from the notches on the inside of the side walls 6 of the external wall element 14. The external wall element 14 can then be removed from the housing 1.

The external wall element 14 is fitted on to the housing 1 by simply pressing it on. The catch projections 12 then engage automatically in the notches.

Figure 5:
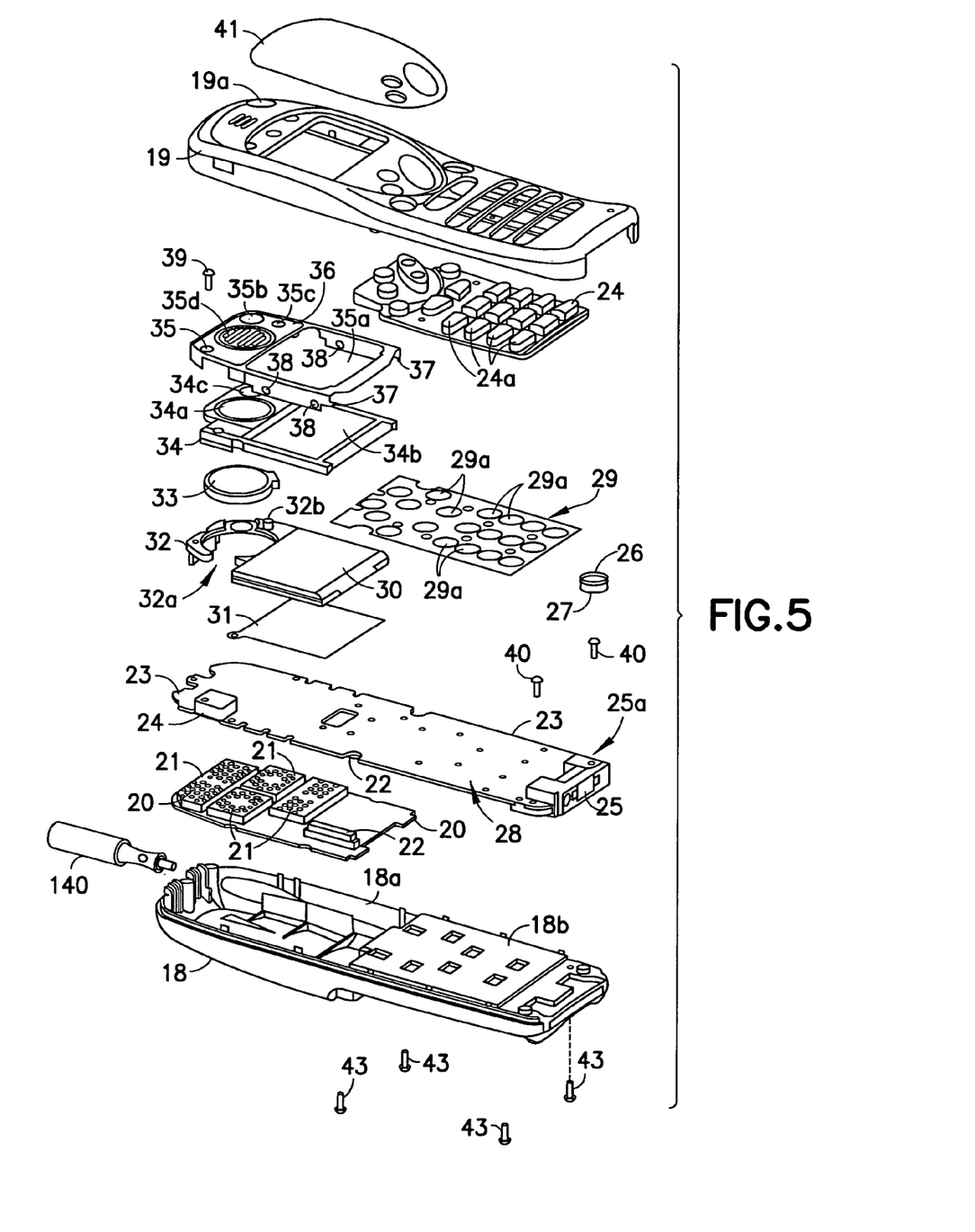
FIG. 5 shows an exploded view of a second embodiment of, the invention.

FIG. 5 shows an exploded view of another embodiment. The mobile phone of FIG. 5 has two outer housings 18, 19. The housings mate together around the periphery of the phone to enclose almost all of the phone's components.

The lower housing 18 has a rear recess 18a, to accommodate a first circuit board 20, and a front shelf 18b to provide support behind the phone's keypad. The circuit board 20 carries and connects together electronic components, including RF (radio frequency) components shielded within RF shields 21. A two-part connector 22 is provided to allow for push-fit electrical connection between circuit board 20 and a second circuit board 23. Circuit board 23 carries other electronic components, including a buzzer 24 (for generating a telephone ringing tone) and an electrical connector 25 (for allowing external connections to be made to the phone—for example to program the phone or connect an external antenna).

A microphone 26 fits in a recess 25a in the connector block. The microphone is surrounded by a rubber sleeve or an o-ring 27 to hold it securely, by friction, in the recess 25a. The microphone has concentric electrical connection pads on its lower surface to connect to spring fingers on the circuit board 23 underneath it irrespective of the microphone's orientation relative to the circuit board. Circuit board 23 has a region 28 of exposed printed conductive zones for co-operating with conductive portions of keypad membrane 29 to provide a touch-sensitive keypad. When the membrane is fixed by adhesive to the circuit board flexible domed regions 29a of the membrane can be pressed to the circuit board to act as key switches for sensing pressure from a user. When the phone is fully assembled each domed region falls below one of the keys 24a of keymat 24 so that a user can actuate the key switches.

A translucent plastics frame 32 fits to the rear end of circuit board 23. The frame carries an LCD (liquid crystal display) unit 30 and a reflector 31. The frame defines a recess 32a dimensioned to receive a speaker 33. The speaker has sprung rear connectors which, when the phone is assembled and the speaker is pressed towards the circuit board connect to corresponding connection pads on the circuit board 23.

To assemble the phone, circuit board 23 is screwed by means of screws 40 to the rear housing 18, holding the circuit board 20 in place behind it in the recess 18a. Microphone 26 is inserted in recess 25a and held in place by the friction of its o-ring 27 against the walls of the recess; at the same time the connections to the microphone are made by the spring fingers. Membrane 29 is fixed by adhesive to the circuit board 23. The frame 32 is offered up to the rear end of circuit board 23 and display unit 30 is soldered to the circuit board 23 to make the connections to the display. Speaker 33 is then set in the corresponding recess 32a, with its spring contacts against the speaker contact pads on circuit board 23.

Next gasket 34 is placed over the frame/display assembly to seal around the edges of the speaker 33 and display device 30. The gasket is formed of flexible rubber with sealing walls that surround holes 34a, 34b for the speaker and display device. The gasket also includes a projecting key portion 34c whose upper end, when the phone has been fully assembled, projects through hole 19a in the upper housing 19. The key portion is flexible and has a conductive coating of carbon ink on its lower end which can make contact with corresponding tracks on the circuit board 23 when the upper end of the key portion is pressed by a user.

A retaining frame 35 is then pushed into place over the gasket to hold the gasket, the speaker 33, the LCD unit 30 and the frame 32 to the circuit board 23. The frame 35 has a generally flat top surface 36 and side walls 37. The frame is stamped from aluminium sheet around 80 μm thick. The top surface 36 of the frame has a hole 35a for the display, a hole 35b for the key portion 34a, a hole 35c for a locating pin 32b on the plastics frame 32 and a grille 35d of holes for the speaker 33. When the frame 35 is pushed into place it squeezes the speaker and the LCD unit between the circuit board 23 and the gasket 34. The side walls of the cover are forced out slightly and then spring back as clips 38, bent from the side walls 37, engage the lower surface of the circuit board 23. The frame 35 thus clips into place and by bending the walls outward again the cover can be removed if needed. The clips 38 then hold the frame to the circuit board 23 and by means of the frame the gasket, the display unit and the speaker are held to the circuit board 23. For security a screw 39 is then inserted through holes in the upper projection, the plastics frame 32, and the circuit board 23 and then into the lower housing 18.

The antenna 140 is screwed in place in the lower housing 18.

At this stage in the assembly process only two components of the phone are loose from the assembly mounted to the rear housing 18; the keymat 24 and the front 19 with its display window 41 fixed in place by adhesive. To complete the assembly process the keymat is sat on the membrane 29, the front housing is mated to the rear housing and the two are screwed together with screws 43.

The present invention may include any novel feature or combination of features disclosed herein either explicitly or implicitly or any generalisation thereof irrespective of whether or not it relates to the presently claimed invention or mitigates any or all of the problems addressed. In view of the foregoing description it will be evident to a person skilled in the art that various modifications may be made within the scope of the invention. For example, it will be appreciated that the invention may be applied to a wide range of electronic devices such as calculators and personal organizers as well as radiotelephones.

The invention claimed is:

1. An apparatus comprising:
a circuit board comprising electronic components;
a display coupled to the circuit board;
a housing substantially surrounding the circuit board and electronic components, wherein the housing comprises a base element covering a bottom side of the circuit board and electronic components and a housing element attached to the base element covering a top side of the circuit board and electronic components, wherein the housing element comprises a display aperture with the display partially projecting therethrough, wherein the housing element comprises first side walls, and wherein the base element supports the housing element at the first side walls; and
a cover removably connected to the housing by a connection, wherein the cover comprises second side walls, wherein the cover and the base element substantially enclose the housing element therebetween, wherein the first side walls of the housing element are between the second side walls of the cover, wherein the base element supports the cover at the second side walls, and wherein at least a portion of the second side walls are in contact with the base element.

2. An apparatus as in claim 1 wherein the connection comprises a snap-in-place releasable connection with a catch projection and an externally accessible activation element adapted to move the catch projection for removing the cover from the housing.

3. An apparatus as in claim 2 wherein the connection comprises a snap-in-place releasable connection, wherein the housing element comprises a movable catch projection of the releasable connection.

4. An apparatus as in claim 1 further comprising a key unit sandwiched between a top side of the housing element and an interior side of the cover.

5. An apparatus as in claim 4 wherein, except at the key unit, the housing element is located directly over a majority of the top side of the housing element.

6. An apparatus comprising:
a circuit board comprising electronic components;
a housing substantially surrounding the circuit board and electronic components, wherein the housing comprises a base element covering a bottom side of the circuit board and electronic components and a housing element attached to the base element covering a top side of the circuit board and electronic components; and
a cover removably connected to the housing by a connection, wherein the cover and the base element substantially enclose lateral side walls of the housing element therebetween, wherein the cover comprises a long side wall having an internal face and an opposite external face, wherein the connection is between the internal face and one of the lateral side walls of the housing element, wherein the external face is substantially aligned with a portion of the base element, wherein the connection comprises a snap-in-place releasable connection for connecting the cover to the housing element, and wherein the housing element comprises a movable catch projection of the releasable connection.

7. An apparatus as in claim 6 wherein the snap-in-place releasable connection comprises the catch projection and an externally accessible activation element adapted to move the catch projection for removing the cover from the housing.

8. An apparatus as in claim 6 further comprising a display, wherein the housing element comprises a display aperture with the display partially projecting therethrough.

9. An apparatus as in claim 6 further comprising a key unit sandwiched between a top side of the housing element and an interior side of the cover.

10. An apparatus comprising:
a circuit board comprising electronic components;
a display operably coupled to the circuit board;
a housing comprising a base element and a separate housing element attached to the base element wherein the housing substantially surrounds the circuit board and electronic components with the circuit board and electronic components located between the base element and the housing element, wherein the housing element comprises a display aperture with the display partially projecting therethrough;
a cover removably connected to the housing by a snap-on connection, wherein the cover comprises long side walls, wherein free edges of the long side walls are supported at a portion of the base element, wherein the cover forms a front face of the apparatus, wherein the cover substantially surrounds lateral side walls of the housing element, and wherein free edges of the lateral side walls of the housing element are supported at the portion of the base element; and
a key unit sandwiched directly between the housing element and an interior side of the cover.

11. An apparatus as in claim 10 wherein the cover and the base element substantially enclose the housing element therebetween.

12. An apparatus as in claim 10 wherein the snap-on connection comprises a portion of the cover being snap-on connected to a movable catch of the housing element.

* * * * *